United States Patent

Koerner

[15] 3,668,428
[45] June 6, 1972

[54] ROOT MEAN SQUARE MEASURING CIRCUIT

[72] Inventor: Henry Koerner, Tucson, Ariz.
[73] Assignee: Burr-Brown Research Corporation
[22] Filed: Aug. 10, 1970
[21] Appl. No.: 62,416

[52] U.S. Cl. .............................. 307/229, 307/310, 328/144
[51] Int. Cl. ........................................................G06g 7/20
[58] Field of Search .................. 328/144; 324/104, 105, 132, 324/98, 99; 307/229, 310

[56] References Cited

UNITED STATES PATENTS

| | | | |
|---|---|---|---|
| 3,321,716 | 5/1967 | Lyon-Caen | 307/310 |
| 3,435,319 | 3/1969 | Richman | 324/105 |
| 3,048,778 | 8/1962 | Rumpel | 324/99 |
| 3,091,939 | 6/1963 | Baude | 307/310 |
| 2,951,211 | 8/1960 | Brashear | 324/99 |

Primary Examiner—Donald D. Forrer
Assistant Examiner—Harold A. Dixon
Attorney—Drummond, Cahill & Phillips

[57] ABSTRACT

A pair of semiconductor junction devices, such as transistors, are connected in a common emitter configuration with suitable forward biasing. The junction devices are matched and each is associated with one of a pair of matched resistors. Heat transfer means connects each resistor with one of the junction devices; heat generated in the resistor is transmitted to the junction device to cause temperature variations therein. The circuit elements, such as transistors, exhibit a forward voltage drop that is a function of the temperature of the element; the voltage drops across the transistors therefore vary as a result of the power being dissipated by the associated resistor. The transistors are connected to a differential amplifier which senses and amplifies the differential voltage resulting from the different voltage drops and produces an output signal in response thereto. The output signal is connected in a feedback loop to one of the matched resistors while an input terminal is provided to the second matched resistor for connecting thereto a signal to be measured.

7 Claims, 2 Drawing Figures

PATENTED JUN 6 1972 3,668,428

INVENTOR.
HENRY KOERNER
BY
Drummond, Cahill & Phillips
ATTORNEYS

ROOT MEAN SQUARE MEASURING CIRCUIT

Since power is proportional to the square of the root mean square (RMS) of the voltage or current of a signal, the accurate measurement of the RMS value is important. Basically, a signal's RMS voltage is the DC voltage that would produce the same amount of power as the signal. Therefore, if a signal were applied to a power dissipating device (such as the generation and dissipation of heat) and the power dissipated measured and then a DC voltage applied until the same rate of power dissipation occurred, the DC voltage would equal the root mean square of the signal's voltage.

The prior art has utilized the above approach by applying the signal to a standard resistance and measuring the power spent with thermocouples; subsequently, a DC voltage is applied to the standard resistor and adjusted until the same amount of power is utilized. This prior art procedure is very time-consuming and requires expensive equipment, the calibrating of which becomes delicate and sometimes critical.

If the waveform of a time-varying signal is known, the RMS value of the voltage or current may be determined mathematically and measurements made by simply applying a scale factor to the peak or average voltage or current. Thus, if the waveform is known to be sinusoidal, then the voltage or current RMS value may be determined by measuring the peak voltage or current, or the average voltage or current, and applying a scale factor of 0.707 or 1.11 respectively. Of course, the scaling method is predicated on a specific waveform and the precise mathematical derivation of the scale factors. If the waveform were complex and not constant, no suitable scale factor could be derived.

It is therefore an object of the present invention to provide root mean square measuring circuitry that will develop a DC output signal proportional to the root mean square of an applied time-varying signal.

It is another object of the present invention to provide a root mean square measuring circuit that will detect the power being dissipated by an applied time-varying signal to produce a feedback signal, the power dissipation of said feedback signal being compared with the power dissipation of said input signal.

It is still another object of the present invention to provide root mean square measuring circuitry wherein power dissipated by an input signal controls the voltage drop of a forward biased active circuit element, the voltage drop being compared to a second voltage drop across a second active circuit element, the forward voltage drop of which is determined by the heat dissipation of a feedback signal.

These and other objects of the present invention will become apparent to those skilled in the art as the description thereof proceeds.

Briefly, in accordance with one embodiment chosen for illustration, a pair of matched resistors are provided, the first of which may be connected to a time-varying input signal, the RMS voltage or current of which is to be measured. The heat generated in the latter resistor is transmitted to the first of a pair of matched bipolar transistors. The junction voltage drop of forward-biased semiconductor junctions is a function of the temperature thereof; thus, the forward voltage drop of the transistors is a predictable function of temperature provided the base-to-emitter voltage is operating in its normal region in a forward-biased configuration. The second resistor is similarly thermally connected to the second transistor, the transistors being connected in a common emitter configuration in a circuit which provides suitable forward biasing. The differential junction voltage drops across the transistors result in a differential signal that is applied to a differential amplifier to produce an output signal that is applied to the second resistor.

The present invention may more readily be described by reference to the accompanying drawings, in which.

Figure 1:
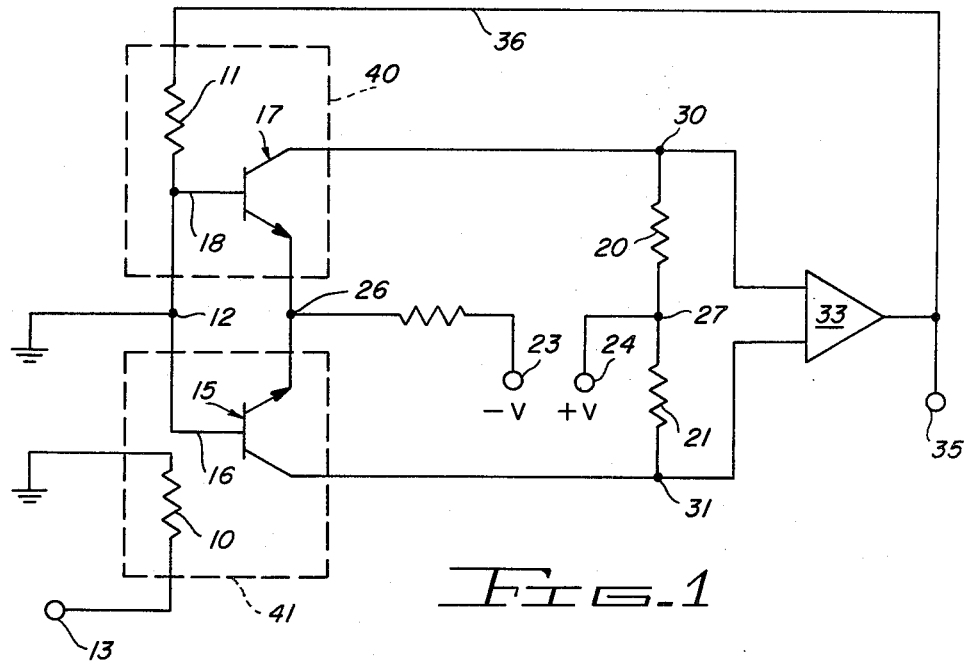
FIG. 1 is a circuit diagram of an embodiment of the present invention, utilizing NPN transistors.

Referring now to FIG. 1, resistors 10 and 11 are matched and are independently connected to ground. Terminal 13 is provided for the connection of a time-varying input signal, the root mean square of which is to be measured. A first sensing element, such as transistor 15, is connected through base electrode 16 to ground and is connected in a common emitter configuration to a second sensing element, such as transistor 17. The latter transistor is also base grounded through base electrode 18. The embodiment chosen for illustration uses matched resistors and matched transistors, although matching of these elements is not absolutely necessary; in some circumstances, it may be appropriate to choose a known mismatch between the resistors, for example, to provide a desired scale factor. Resistors 20 and 21 are connected to the collector electrodes of transistors 17 and 15 respectively and are connected to each other at 27. A suitable biasing potential is applied to terminals 23 and 24. Terminals 30 and 31 are connected to a differential amplifier 33 which may be a conventional high-gain differential input DC amplifier, such as an operational amplifier. The output signal derived from the differential amplifier 33 is applied to an output terminal 35 and is also utilized as a feedback signal through conductor 36 to the resistor 11.

Transistors 15 and 17 incorporate semiconductor junctions which, for purposes of the present description, may be considered any element that produces a forward voltage drop when forward-biased and whose forward voltage drop is a function of the temperature of the element. For example, the NPN transistors 15 and 17 exhibit a base-to-emitter voltage drop that is a function of the junction temperature when operated in its normal active region with the base-emitter junction forward-biased.

The transistor 17 is placed in close thermal proximity to the resistor 11 by heat transfer means 40. The heat transfer means may be formed by any convenient means to produce heat transfer from resistor 11 to transistor 17 which is much greater than the heat transfer from either element to any other heat sink. For example, the heat transfer means 40 may conveniently be formed of a circuit chip, a circuit board, or other element that will effectively transmit heat from the resistor to the transistor. Similarly, heat transfer means 41 is provided for the transmission of heat from resistor 10 to the transistor 15, which is much greater than the transmission from either element to any other heat sink. The two heat transfer means, 40 and 41, are nearly equal and much better than any heat transfer means between elements of opposite resistor-transistor pairs.

The temperature of the resistor is a linear function of the power dissipated in the resistor and is thus the function of the square of the root mean square of the applied voltage or current.

$P_{av}$ = average power $$= \frac{1}{\Delta t R_1} \int_0^{\Delta t} (v_1(t))^2 dt$$

When a time-varying signal is applied to the terminal 13, the power dissipated in the resistor 10 results in heat transfer and a change in the forward voltage drop of the base-to-emitter voltage of transistor 15. Assuming the corresponding voltage drop of transistor 17 is different, an error voltage will be presented at terminals 30 and 31 and will be applied to the amplifier 33. The resulting DC output signal fed back through conductor 36 to resistor 11 will cause a change in the temperature of the resistor and the temperature of the base-to-emitter junction of the transistor 17. Since, in the embodiment chosen for illustration, resistors 10 and 11 are matched and transistors 15 and 17 are matched, the power being dissipated in resistor 11 will therefore be regulated by the resulting voltage drop in transistor 17. The feedback from amplifier 33 will consequently cause the error signal existing between terminals 30 and 31 to be reduced to substantially zero. When the error signal is reduced to zero, the signal thus present at terminal 35 is a DC signal directly proportional to the RMS of the time-varying signal applied to terminal 13. In other words, power supplied by the amplifier 33 to be dissipated in resistor 11 is equal to the power dissipated by the time-varying signal applied to terminal 13 and dissipated in resistor 10.

Thus
$$\frac{1}{R_1}(v_1 RMS)^2 = \frac{1}{R_2}(v_0)^2$$

since
$$R_1 = R_2$$

then
$$v_0 = v_1 RMS$$

or
$$R_1(i_1 RMS)^2 = R_2(i_0)^2$$

$$R_1 = R_2$$

then
$$i_0 = i_1 RMS$$

Since the circuit operates on differential or error signals and since the power dissipating resistors and transistors in the present embodiment are matched, the effects of external environmental factors will normally be cancelled. Further, since the resistor 10 is electrically independent from the remainder of the circuit, root mean square measurements of complex signals may accurately be made even though the signals may contain waveform components which would otherwise affect the operation of the measuring circuitry.

Figure 2:
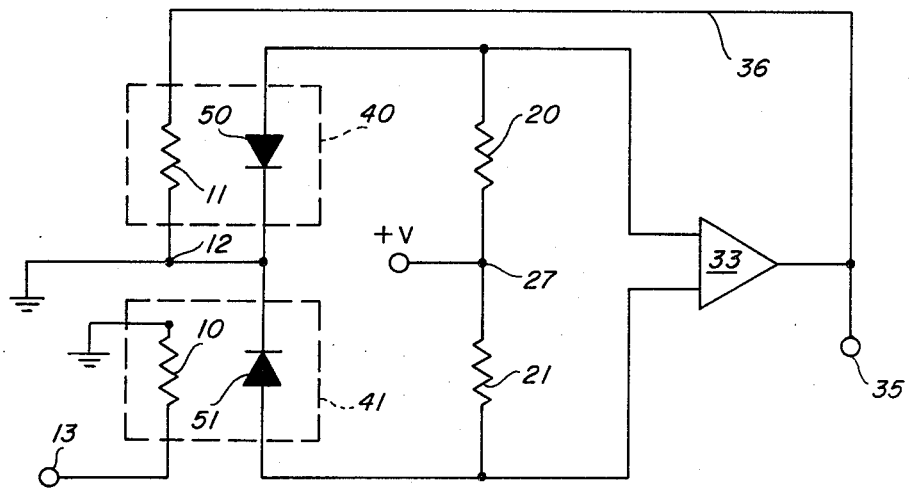
FIG. 2 is a circuit diagram of another embodiment of the present invention, utilizing diodes.

The embodiment shown in FIG. 2 is identical in concept and utilizes identical components with the circuit of FIG. 1, with the exception of diodes 50 and 51; the diodes provide forward-biased semiconductor junctions as sensing elements in the manner as the transistors in the embodiment of FIG. 1. The remaining elements of the circuit of FIG. 2 are numbered the same as in FIG. 1 and the operation need not separately be described.

I claim:

1. A root mean square measuring circuit comprising: first and second matched resistors; first and second matched transistors, each having a continuous voltage drop thereacross a function of temperature, and each having an emitter electrode connected to the emitter electrode of the other; a pair of resistors, each connected to a collector electrode of one of a different one of said transistors, said resistors connected to each other; a biasing source connected between the junction of said emitters and the junction of said resistors; a differential amplifier connected between the junctions formed by the connection of said resistors with said collector electrodes for continuously generating an output signal in response to a difference in voltage drop across said transistors; means for connecting said first matched resistor to a signal to be measured by heating said first matched resistor; means for electrically isolating said input signal and said first resistor from the remaining circuitry; feedback means connecting said continuously generated output signal to said second matched resistor for heating said second matched resistor, whereby said voltage drop across said second transistor is made equal to the voltage drop across said first transistor.

2. A root mean square measuring circuit comprising: first and second resistors; first and second semi-conductor junctions, each having a voltage drop thereacross a known function of junction temperature; biasing means connected to said semiconductor junctions for continuously developing a voltage drop across each; heat transfer means thermally connecting said first resistor to said first semiconductor junction, and heat transfer means thermally connecting said second resistor and said second semiconductor junction; differential amplifier means connected to said first and second semiconductor junctions responsive to a difference in the voltage drops across said semiconductor junctions for continuously generating an output signal; means for connecting said first resistor to a signal to be measured for heating said first resistor; means for electrically isolating said input signal and said first resistor from the remaining circuitry; feedback means connecting said continuously generated output signal to said second resistor for heating said second resistor whereby said voltage drop across said second semiconductor junction is made equal to a known function of the voltage drop across said first semiconductor junction.

3. The combination set forth in claim 1, wherein said first and second resistors are matched and said first and second sensing elements are matched, whereby said voltage drop across said second sensing element is made equal to the voltage drop across said first sensing element.

4. The combination set forth in claim 1, wherein said semiconductor junctions are forward-biased.

5. The combination set forth in claim 4, wherein said forward-biased semiconductor junctions are junctions of semiconductor diodes.

6. The combination set forth in claim 4, wherein said forward-biased semiconductor junctions are junctions of transistors.

7. The combination set forth in claim 6, wherein said first and second resistors are matched and said first and second sensing elements are matched whereby said voltage drop across said second sensing element is made equal to the voltage drop across said first sensing element.

* * * * *